US012639946B2

(12) United States Patent
Paiuk

(10) Patent No.: US 12,639,946 B2
(45) Date of Patent: *May 26, 2026

(54) EXECUTION OF A WORKFLOW BASED ON A TYPE OF OBJECT SHARED IN A VIDEO CONFERENCE

(71) Applicant: Zoom Communications, Inc., San Jose, CA (US)

(72) Inventor: Alejandro Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 278 days.

This patent is subject to a terminal disclaimer.

(21) Appl. No.: 18/193,216

(22) Filed: Mar. 30, 2023

(65) Prior Publication Data

US 2024/0331381 A1     Oct. 3, 2024

(51) Int. Cl.
| | |
|---|---|
| *G06K 9/00* | (2022.01) |
| *G06V 20/40* | (2022.01) |
| *G06V 20/62* | (2022.01) |
| *G06V 30/416* | (2022.01) |

(52) U.S. Cl.
CPC .............. *G06V 20/46* (2022.01); *G06V 20/63* (2022.01); *G06V 30/416* (2022.01)

(58) Field of Classification Search
None
See application file for complete search history.

(56) References Cited

U.S. PATENT DOCUMENTS

| | | | | |
|---|---|---|---|---|
| 8,731,339 B2 * | 5/2014 | Chan | .................. | G06V 30/40 |
| | | | | 382/312 |
| 8,855,423 B2 * | 10/2014 | Boncyk | .................. | G06T 7/13 |
| | | | | 382/181 |
| 9,462,028 B1 * | 10/2016 | Levinson | .............. | H04L 65/765 |
| 9,471,822 B1 | 10/2016 | Crooks | | |
| 9,898,619 B1 * | 2/2018 | Hadsall | .............. | G06F 21/6245 |
| 10,200,654 B2 * | 2/2019 | Szymczyk | ............ | H04N 7/157 |
| 10,290,371 B1 * | 5/2019 | Pekarske | ............... | G16H 40/40 |
| 10,607,463 B2 | 3/2020 | Pan et al. | | |

(Continued)

FOREIGN PATENT DOCUMENTS

| | | | | | |
|---|---|---|---|---|---|
| CN | 110569839 A | * | 12/2019 | ......... | G06F 18/2135 |
| CN | 112153320 A | * | 12/2020 | ............. | G06V 20/46 |
| CN | 114040094 A | * | 2/2022 | ........... | H04N 23/695 |

OTHER PUBLICATIONS

CN-110569839-A (machine translation) (Year: 2019).*

(Continued)

*Primary Examiner* — Chan S Park
(74) *Attorney, Agent, or Firm* — Young Basile Hanlon & MacFarlane, P.C.

(57) ABSTRACT

A video conference system for execution of a workflow based on a type of object shared in a video conference. The video conference system receives a video stream captured by a camera device of a first participant of a video conference; performs object detection on the video stream during the video conference to determine an object type of an object presented by the first participant to the camera device; determines a workflow related to the object type based on the determined object type; and outputs data for executing the workflow at a device of a second participant of the video conference.

20 Claims, 10 Drawing Sheets

(56) References Cited

U.S. PATENT DOCUMENTS

| | | | | |
|---|---|---|---|---|
| 10,623,569 | B2 * | 4/2020 | Moran | H04M 3/5235 |
| 10,834,026 | B2 * | 11/2020 | Nagaraja | G16H 80/00 |
| 11,062,121 | B2 * | 7/2021 | Croxford | G06V 10/82 |
| 11,126,977 | B1 * | 9/2021 | Craggs | H04M 15/84 |
| 11,144,671 | B1 | 10/2021 | Springer et al. | |
| 11,190,733 | B1 | 11/2021 | Anderson et al. | |
| 11,240,181 | B1 * | 2/2022 | Nagaraja | G16H 40/20 |
| 11,295,122 | B2 * | 4/2022 | Huang | G06V 10/811 |
| 11,494,502 | B2 | 11/2022 | Miller et al. | |
| 11,546,661 | B2 | 1/2023 | Brannon | |
| 11,595,703 | B2 * | 2/2023 | Pollock | G06V 40/20 |
| 11,727,152 | B2 * | 8/2023 | Springer | H04W 12/02 |
| | | | | 726/26 |
| 11,838,139 | B1 * | 12/2023 | Ramoutar | G06F 16/93 |
| 11,861,923 | B2 * | 1/2024 | Shang | G06V 30/19093 |
| 2010/0332404 | A1 * | 12/2010 | Valin | G06Q 99/00 |
| | | | | 705/310 |
| 2011/0246172 | A1 * | 10/2011 | Liberman | H04M 3/56 |
| | | | | 348/14.09 |
| 2013/0004076 | A1 * | 1/2013 | Koo | G06F 18/254 |
| | | | | 382/176 |
| 2013/0188887 | A1 * | 7/2013 | Chan | G06V 30/40 |
| | | | | 382/312 |
| 2013/0218721 | A1 * | 8/2013 | Borhan | G06Q 30/02 |
| | | | | 705/26.41 |
| 2015/0012426 | A1 * | 1/2015 | Purves | G02B 27/017 |
| | | | | 705/41 |
| 2015/0073907 | A1 * | 3/2015 | Purves | G06Q 20/384 |
| | | | | 705/14.58 |
| 2016/0109954 | A1 * | 4/2016 | Harris | G06V 20/20 |
| | | | | 345/156 |
| 2016/0294906 | A1 * | 10/2016 | Levinson | H04N 21/25816 |
| 2016/0350592 | A1 * | 12/2016 | Ma | G06V 10/757 |
| 2017/0011232 | A1 | 1/2017 | Xue et al. | |
| 2017/0104958 | A1 * | 4/2017 | Farrell | G06V 40/172 |

| | | | | |
|---|---|---|---|---|
| 2018/0359363 | A1 * | 12/2018 | Moran | G06V 30/413 |
| 2019/0392194 | A1 * | 12/2019 | Croxford | G06V 20/64 |
| 2020/0143343 | A1 * | 5/2020 | Atsmon | G07D 7/12 |
| 2020/0244605 | A1 * | 7/2020 | Nagaraja | H04L 51/02 |
| 2021/0271886 | A1 * | 9/2021 | Zheng | G06V 20/46 |
| 2022/0084544 | A1 | 3/2022 | Kappagantu | |
| 2022/0191430 | A1 * | 6/2022 | Anderson | G06V 20/41 |
| 2022/0245277 | A1 * | 8/2022 | Springer | H04L 63/08 |
| 2022/0245283 | A1 | 8/2022 | Springer et al. | |
| 2022/0264180 | A1 * | 8/2022 | Brannon | H04N 21/845 |
| 2022/0345755 | A1 | 10/2022 | Pollock et al. | |
| 2022/0398908 | A1 * | 12/2022 | Tazume | G08B 13/19613 |
| 2023/0155812 | A1 | 5/2023 | Bennison | |
| 2023/0206329 | A1 | 6/2023 | Cella et al. | |
| 2024/0054786 | A1 * | 2/2024 | Andresen | H04N 7/147 |
| 2024/0330496 | A1 * | 10/2024 | Paiuk | G06F 21/6245 |
| 2024/0331381 | A1 | 10/2024 | Paiuk | |

OTHER PUBLICATIONS

CN-112153320-A (machine translation) (Year: 2020).*
CN-114040094-A (machine translation) (Year: 2022).*
Protecting Personal Information, A guide for Gusiness, Federal Trade Comission, business.ftc.gov, Oct. 2016, 36 pages.
Time Doctor, Top 10 Call Center Compliance Issues (With Useful Tips), https://biz30.timedoctor.com/call-center-compliance-issues/, Jan. 25, 2022, 17 pages.
5 Call Center Security Tips For Protecting Customer Data and Preventing Breaches, https://www.tmcnet.com/channels/call-center-management/articles/419851-5-call-center-security-tips-protecting-customer-data.htm, Mia Papanicolaou, Apr. 6, 2016, 8 pages.
How Agent Exposure to Customer Data is Putting Contact Centers at Risk, ICMI, https://www.icmi.com/resources/2017/how-agent-exposure-to-customer-data-is-putting-contact-centers-at-risk, Tim Critchley, Dec. 6, 2017, 7 pages.

* cited by examiner

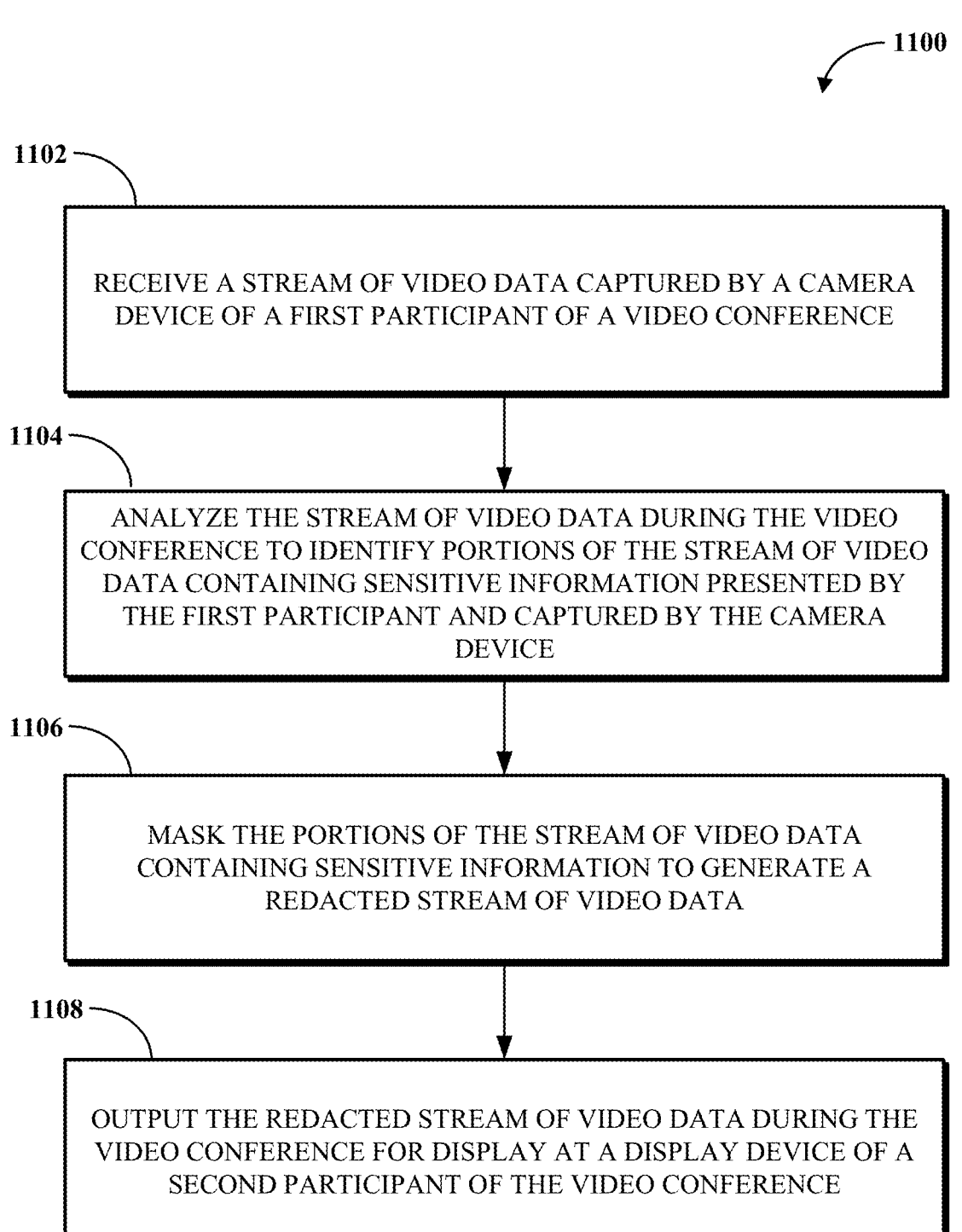

1100

1102

RECEIVE A STREAM OF VIDEO DATA CAPTURED BY A CAMERA DEVICE OF A FIRST PARTICIPANT OF A VIDEO CONFERENCE

1104

ANALYZE THE STREAM OF VIDEO DATA DURING THE VIDEO CONFERENCE TO IDENTIFY PORTIONS OF THE STREAM OF VIDEO DATA CONTAINING SENSITIVE INFORMATION PRESENTED BY THE FIRST PARTICIPANT AND CAPTURED BY THE CAMERA DEVICE

1106

MASK THE PORTIONS OF THE STREAM OF VIDEO DATA CONTAINING SENSITIVE INFORMATION TO GENERATE A REDACTED STREAM OF VIDEO DATA

1108

OUTPUT THE REDACTED STREAM OF VIDEO DATA DURING THE VIDEO CONFERENCE FOR DISPLAY AT A DISPLAY DEVICE OF A SECOND PARTICIPANT OF THE VIDEO CONFERENCE

FIG. 11

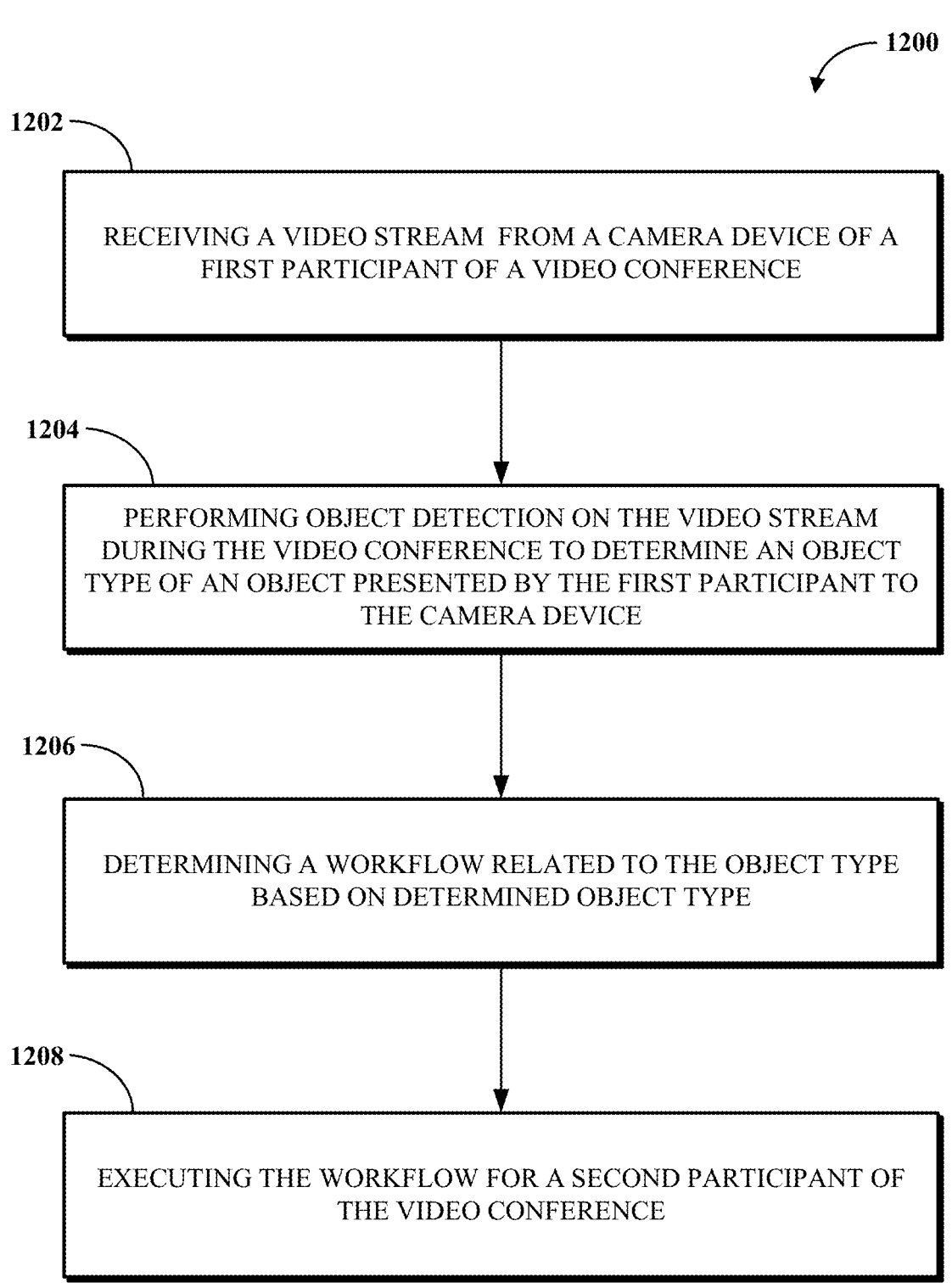

1200

1202 ──

RECEIVING A VIDEO STREAM FROM A CAMERA DEVICE OF A
FIRST PARTICIPANT OF A VIDEO CONFERENCE

1204 ──

PERFORMING OBJECT DETECTION ON THE VIDEO STREAM
DURING THE VIDEO CONFERENCE TO DETERMINE AN OBJECT
TYPE OF AN OBJECT PRESENTED BY THE FIRST PARTICIPANT TO
THE CAMERA DEVICE

1206 ──

DETERMINING A WORKFLOW RELATED TO THE OBJECT TYPE
BASED ON DETERMINED OBJECT TYPE

1208 ──

EXECUTING THE WORKFLOW FOR A SECOND PARTICIPANT OF
THE VIDEO CONFERENCE

FIG. 12

EXECUTION OF A WORKFLOW BASED ON A TYPE OF OBJECT SHARED IN A VIDEO CONFERENCE

FIELD

This disclosure relates to techniques for sharing information in a video conference, and more particularly to automated execution of a workflow based on a type of object shared in a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 11 is a flowchart of an example of a technique for sharing sensitive information in a video conference.

FIG. 12 is a flowchart of an example of a technique for generating a workflow based on a type of object identified in a video stream.

DETAILED DESCRIPTION

Figure 1:
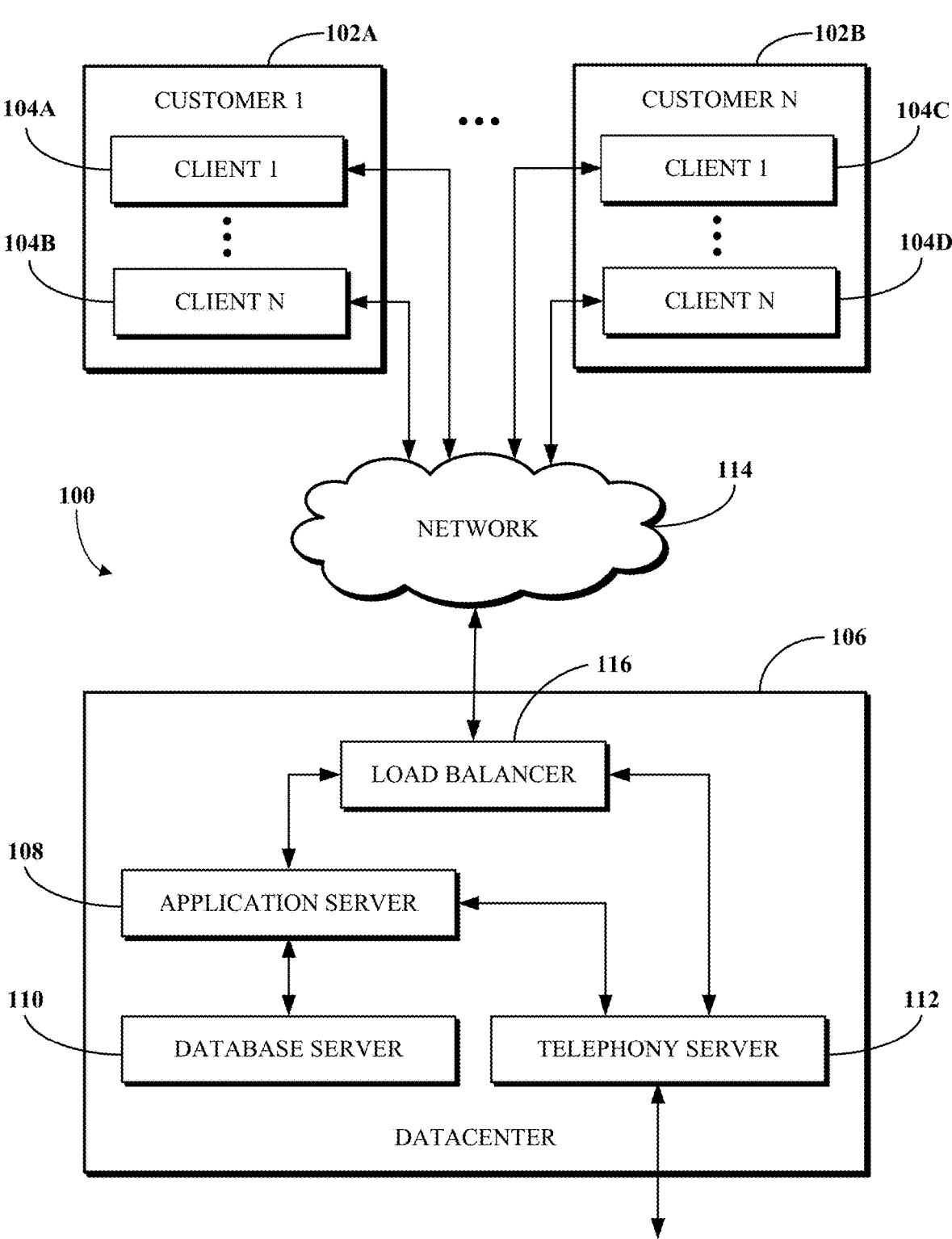
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

An example of a service that may be provided by a UCaaS platform is a video conference service. A video conference service enables conference participants to interact with one another using client devices that implement a video conference client. The client devices can have video and audio sensors to capture local video and audio to send to client devices of other conference participants, and a video and audio output device to output video and sound captured at a client device of the other conference participants. The UCaaS platform can provide the video conference service to a large group of participants who are then able to interact as a group. In some instances, a video conference can have a few as two participants.

Another example of a service that may be provided by a UCaaS platform is a contact center service. A contact center service enables a contact center user to initiate a contact center engagement with a contact center agent to address one or more topics, for example, technical support, account maintenance, or billing inquiries. The contact center engagement may be implemented over one of several communication modalities, such as telephony, video, chat, email, or social media. For example, a contact center implemented using a contact center service (e.g., of a UCaaS platform or otherwise) can utilize a video conference between a first participant, or agent of the contact center, and a second participant, or user of the contact center, to provide user services such as customer support, customer service, sales services, and other user services. The video conference may provide an enhanced experience for the participants as compared to other solutions using telephone calls or text-based chat between an agent and a user.

A video conference session can leverage visual content to provide additional functionality that the participants can use to interact in ways which may not be available using other types of interactions. For example, telephone interaction requires a user to speak when inputting information or enter information using a keypad on a phone. Speaking audibly when other individuals are within audible range may result in privacy concerns when the information is sensitive. Entering information using a telephone keypad may result in incorrect data being input. To combat the audible range privacy concern and the accuracy of user input, the contact center can leverage features of the video conference session to streamline the interactions between the participants and which do not require audio interactions or manual data input. For example, in place of a conference participant entering information using a keypad or audibly stating information, the conference participant may display an object containing the information to a video sensor of a client device to input the information. Such interactions reduce the potential privacy concern of audibly stating sensitive information and the potential data input errors associated with manually inputting information.

However, such visual presentations of sensitive information using conventional systems are not without drawbacks. Contact centers may use remote agents to perform service activities for the contact center including interacting with users using video conferences. The remote agents may be located at areas that are not under control of the contact center, which may lead to security risks when users of the contact center input sensitive information. For instance, a remote agent may have access to items not normally allowed at a contact center such as a camera which they can use to take a picture of the sensitive information provided by the user. If the user inputs data by displaying an object containing sensitive information, such as buy holding a credit card in front a camera, the remote agent could discreetly record the credit card number using a camera or even a pen and paper. Sensitive information such as the credit card number may be used by a malicious actor to perform malicious acts such as identity theft and credit card fraud. This problem is compounded during busy times such as during the holiday season when a contact center may not have time to thoroughly vet each temporary employee.

Implementations of this disclosure address problems such as these by protecting sensitive information shared in a video conference, for example, by detecting objects that a conference participant presents to a video sensor of a client device, extracting information from the object, and applying a mask to the sensitive information to prevent the sensitive information from being displayed at an agent's client device. Additionally, allowing participants to present objects containing information in place of a manual user input during a video conference allows the contact center to automate workflows for the agent based on the type of object being presented by the participant. For example, if a conference participant presents a credit card object, the contact center may determine that the conference participant intends to pay for an item and, in response, open a payment workflow at a client device of the agent. In another example, if a conference participant presents an identification card object the contact center may determine that the participant intends to verify their identity and, in response, the contact center can open an identification verification workflow at the agent's client device. The contact center can implement these functions by performing object detection on a video data stream of the participant, determining when an object of interest is presented in the video data stream, extracting useful information from the object of interest, determining if the object of interest is associated with sensitive information, and masking the sensitive information before displaying video containing the object of interest at the agent's terminal.

In addition to masking sensitive information, the contact center can use the information extracted from the object of interest to select a workflow for an agent. Thus, a user interface of the agent's client device may automatically proceed to a workflow based on the object of interest, which may be at least partially completed based on the information extracted from the object, to facilitate the interactions between the user and the agent. For example, the user interface of the agent's client device may proceed to a payment screen responsive to the user presenting a credit card, an item description screen responsive to the user presenting package, or a return activity responsive to the user presenting a receipt to a video sensor of their client device.

To describe some implementations in greater detail, reference is first made to examples of hardware and software structures used to implement a system for protecting sensitive information shared in a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as a UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to case the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
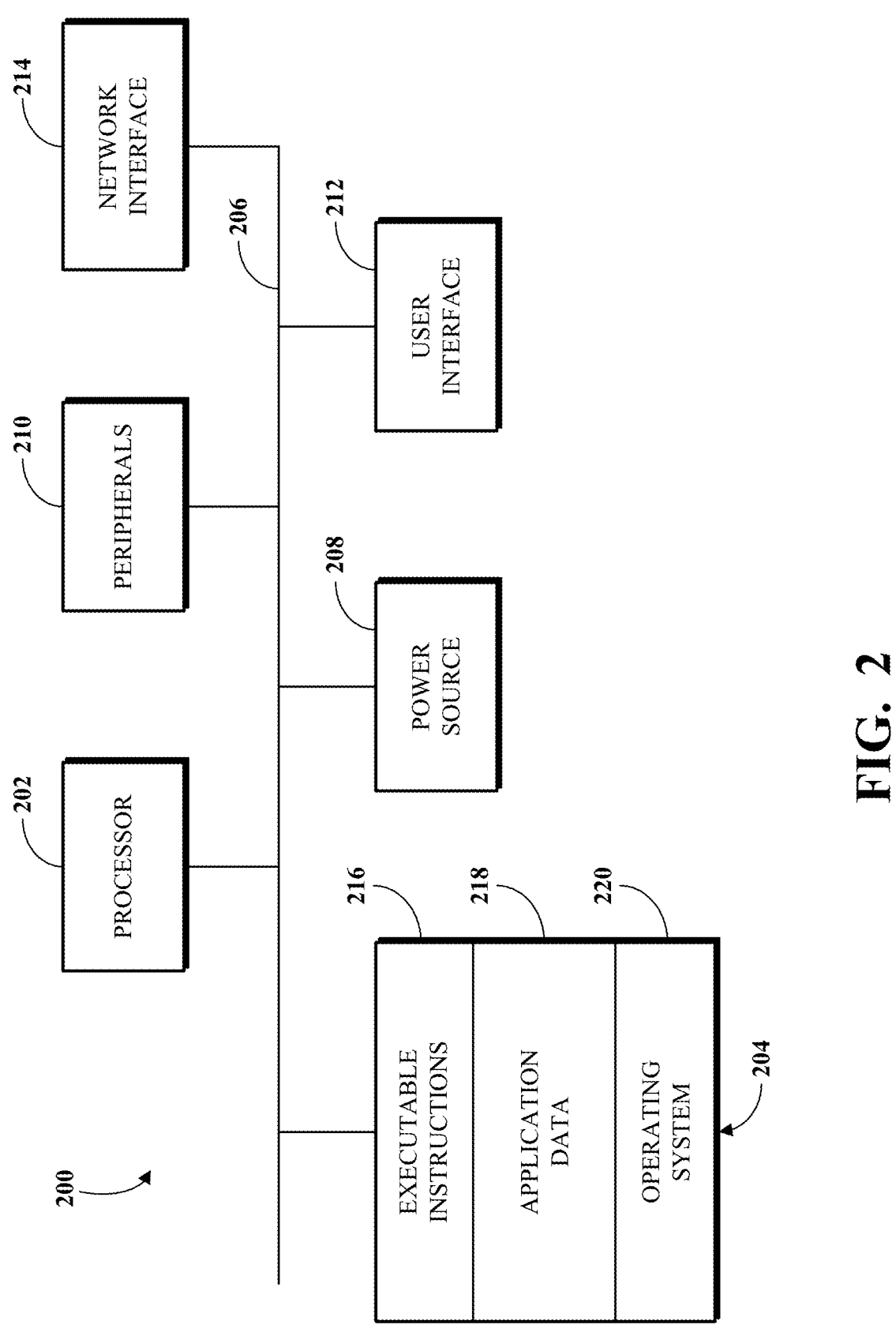
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
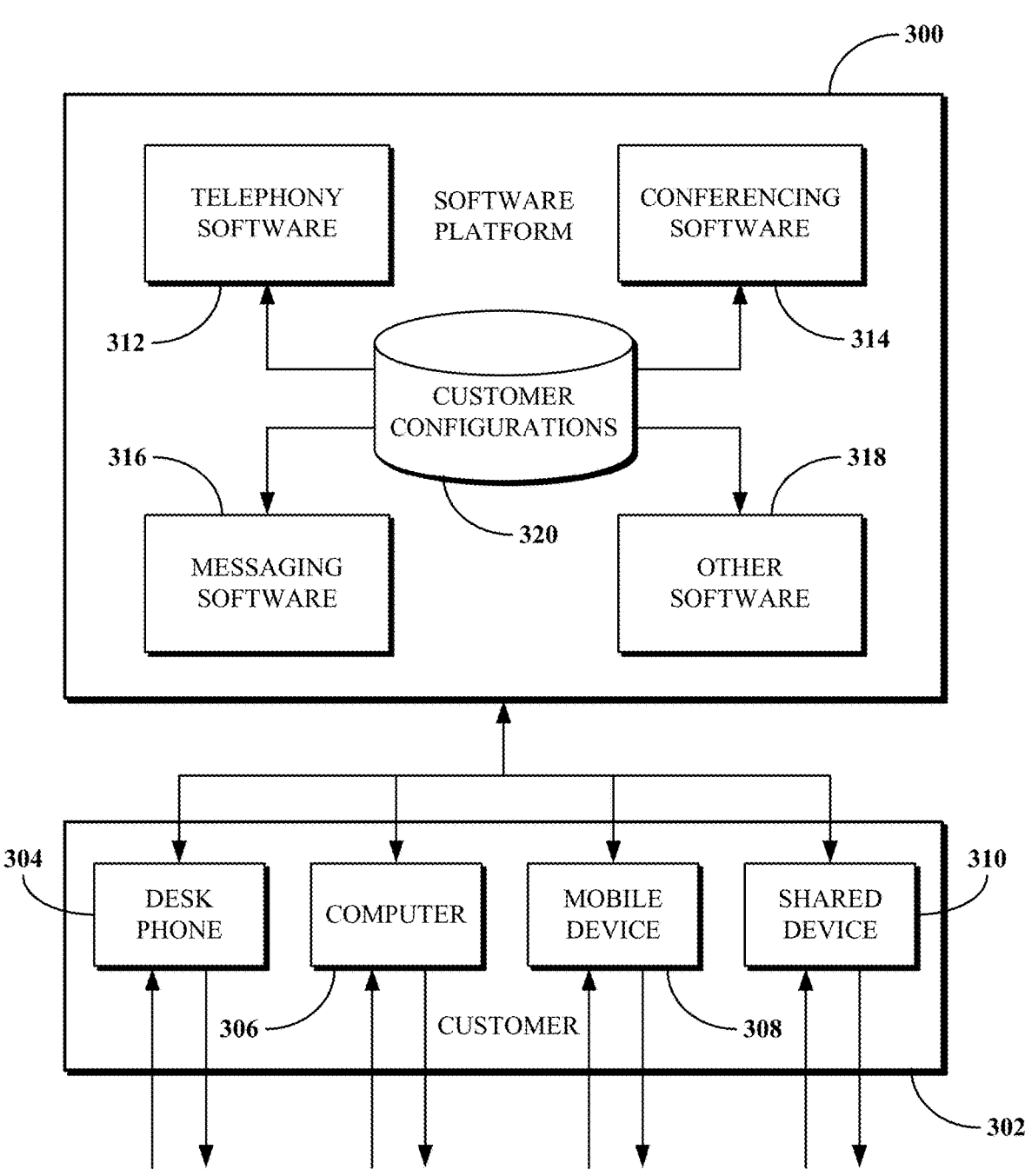
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for protecting sensitive information shared in a video conference, for example, by masking sensitive data and/or implementing a workflow based on an identified object. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
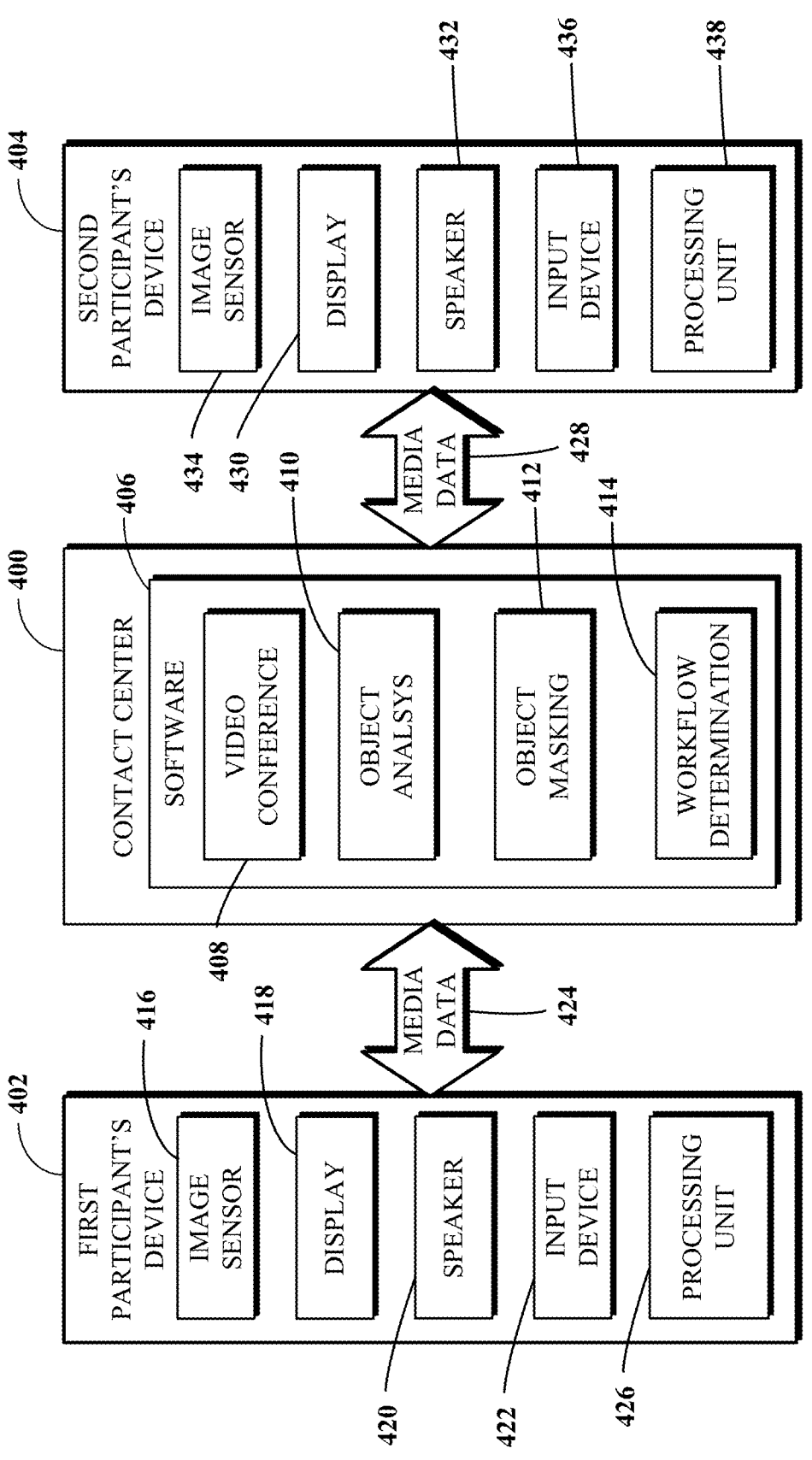
FIG. 4 is a block diagram of an example of a contact center for facilitating a video conference between a first participant and a second participant.

FIG. 4 is a block diagram of an example of a contact center system for facilitating a video conference between a first participant and a second participant. The contact center system enables a camera at the first participant's device to capture objects having information for data input. A contact center 400, which may be implemented in connection with a software platform (e.g., the software platform 300 shown in FIG. 3), is accessed by a first participant's device 402 and a second participant's device 404, and the contact center 400 provides a video conference session to the first participant's device 402 and the second participant's device 404. For example, the first participant's device 402 and the second participant's device 404 may each be one of the clients 304 through 310 shown in FIG. 3 or a non-client device. The contact center 400 can be implemented using one or more servers and software running thereon. For example, the contact center 400 may be implemented using one or more of the servers 108 through 112 shown in FIG. 1 and may use communication software such as or similar to the software 312 through 318 shown in FIG. 3. The contact center 400 further executes software 406 including video conference software 408 for implementing a video conference, object analysis software 410 for identifying objects whose image was captured by the first participant's device, object masking software 412 for masking portions of a video containing sensitive information, and workflow determination software 414 for determining a workflow based on an identification of a type of object captured in the video.

The first participant's device 402 includes an image sensor 416 for capturing video data at the location of the first participant, a display 418 for displaying visual information to the first participant, a speaker 420 for outputting audio information to the first participant, an input device 422 for the first participant to interact with the first participant's device 402, and a processing unit 426 configured to execute instructions for implementing a video conference client application. The processing unit 426 encodes media data 424 for transmission to the contact center 400 and decodes media data 424 received from the contact center 400 for output at the first participant's device 402. The media data 424 transmitted to the contact center 400 can include video data captured by the image sensor 416, audio data captured by an audio sensor (not shown), text data input using the input device 422, and other information such as location information, authentication information, or other data. The media data 424 can be sent to the contact center 400 as a stream of media data 424. The contact center 400 is configured to modify the media data 424 received from the first participant's device 402 and transmit the modified media data 428 to the second participant's device 404. The modified media data 428 received from the contact center 400 includes media data that originated from the first participant's device 402 including video data, audio data, textual data, and other information. The media data 428 received from the contact center 400 can be output by the second participant's device 404 using a display device 430 and a speaker 432. The second participant's device 404 can further include an image sensor 434 for capturing video data to send to the first participant's device 402, an input device 436 for the second participant to interact with the second participant's device 404, and a processing unit 438 configured to execute instructions for implementing a video conference client and a contact center application.

The processing unit 438 can perform similar operations to the processing unit 426 of the first participant's device 402 and can encode media data 428 for transmission to the contact center 400 and decode media data 428 received from the contact center 400 for output at the second participant's device 404. The media data 428 transmitted to the contact center 400 can include video data captured by the image sensor 434, audio data captured by an audio sensor (not shown), text data input using the input device 436, and other information such as location information, authentication information, or other data. The contact center 400 is configured to modify the data received from the second participant's device 404 and transmit the modified media data to the first participant's device 402. The media data 428 received from the contact center 400 can include modified media data from the device including video data, audio data, textual data, and other information. The media data received from the contact center 400 can be output by the second participant's device using the display device 430 and the speaker 432.

The second participant can be an agent of the contact center 400 and the processing unit 438 can implement software associated with services that the contact center 400 provides. For example, the controller can implement user interface at the second participant's device for performing service-related tasks such as inputting task related information, retrieving task related information, and viewing task related information.

The video conference software 408, which may, for example, be the conferencing software 314 shown in FIG. 3, implements a video conference session between the first participant's device 402 and the second participant's device 404 and manages the media data sent between the first participant's device 402 and the second participant's device 404. The video conference software 408 can modify the media data received from the participants' devices 402, 404 to perform tasks such as compressing media data, reducing a resolution of a video stream, editing portions of a video stream, enhancing audio and/or video, and performing other tasks.

The object analysis software 410 is configured to implement functions to analyze a video data to identify types of objects captured in the video data and determine whether the type of object is associated with sensitive information. The object analysis software 410 can use neural network-based and/or non-neural network-based approaches to identify the types of objects in the video data. The object analysis software 410 can be configured to identify objects of interest to the contact center 400 such as objects that are related to services provided by the contact center 400. For example, the object analysis software 410 can be trained using known objects of interest such as images of payment cards, identification cards, text, bar codes, quick response (QR) codes, and other objects. Each type of object can have an associated sensitivity level based on the type of object. For example, payment cards may have a high level of sensitivity while bar codes may have a relatively low level of sensitivity. Thus, for each type of object identified in the video data, the object analysis software 410 may output an identification of the type of object, the location of the image of the object in the video data, and a sensitivity level associated with the object. Additionally, the object analysis software 410 is configured to extract relevant information from the object such as numbers, bar codes, text, and other information. For example, the object analysis software 410 can be configured to perform optical character recognition to extract the relevant information from the object.

The object masking software 412 masks the appearance of the objects in the video data when the sensitivity level meets a threshold. The object masking software 412 can mask the appearance of the object using a variety of techniques. In on example, the object masking software 412 can modify the video data to mask the object having the sensitive data. In another example, the object masking software 412 can modify the video data to remove the sensitive information such as by cutting frames of the video data, replacing pixels displaying the sensitive information object with other pixels, or otherwise removing the representation of the sensitive information. The object masking software 412 can manipulate a portion of a video frame to mask only the sensitive data, or in other examples the object masking software 412 may manipulate an entire video frame to mask the entire video frame in which the sensitive object is displayed.

The workflow determination software 414 is configured to determine a suitable workflow for the second participant to begin based on the type of object identified in the video data. For example, if the first participant presents a payment card to the image sensor 416, the workflow determination software 414 may determine to open a payment workflow at the second participant's device 404. The workflow determination software 414 can add information for starting the workflow to the media data 428 transmitted to the second participant's device 404 or may transfer the information in a separate communication. Additionally, the workflow determination tool can send information extracted by the object analysis software to the second participant's device. For example, if the workflow is a payment workflow, the workflow determination software 414 may include information in the media data stream for opening a payment workflow at the second participant's device 404 and payment information extracted by the object analysis software 410. Other examples of object types and associated workflows include an identification which may open an identity verification workflow, a package barcode which may open an item information workflow, and a receipt barcode which may open an item return workflow.

In some implementations, the workflow can be related to a physical object located near either the first participant's device 402 or the second participant's device 404. For example, the first participant can present an object including information for verifying their identity and the information may be used to unlock a physical object at the second participant's location. One example scenario in which unlocking a physical object at the second participants location may be used is in the delivery of packages. The second participant can be a delivery person and the first participant can provide information for unlocking a container, gate, door, or other object for the second participant to access. In another example, the physical object can be located near the first participant and the physical object can be unlocked in response to the first participant presenting an item to the image sensor of the first participant's device 402. For example, the first participant can present an identification card to the image sensor 416 and the second participant can unlock a physical object near the first participant in response. In one example, an alcohol delivery parcel may be placed in a locked container that can only be accessed after the first participant presents a valid identification card to the image sensor 416.

Although the contact center system of FIG. 4 is illustrated with the contact center software 406 being located at the contact center 400, in some implementations some of the contact center software may be located elsewhere. For instance, an external service may be used to implement the object analysis software 410. Alternatively, portions of the software 406 may be implemented at the first participant's device 402. For instance, the object analysis software 410 may be implemented at the first participant's device 402 such that the object sensitivity and content can be determined prior to transmitting the media data 424 to the contact center 400. Or, in implementations in which the object masking software 412 is implemented at the first participant's device 402, the video data may be modified to mask the sensitive information prior to sending the media data 424 to the contact center 400.

Conference participants can share sensitive information in contexts other a contact center using the described video conference system. In some implementations, the described system can be used to share sensitive information between participants in a video conference. For example, a video conference application may have a function for sending money from a first participant to the second participant. The function can receive sensitive data from the first participant using a video sensor and mask the sensitive information so that the second participant cannot see the sensitive information. Or, in another example, more than two participants may use a video conference system to interact with one another. A first participant can share sensitive information with a second participant and the video conference system can use the described techniques to mask the sensitive information so that a third participant cannot view the sensitive information. The video conference system can provide preferences for a participant for selecting which participants are able to view sensitive information and which participants cannot.

In another implementation, video conference participants may share sensitive information outside of a contact center, such as a bank customer calling a personal banker. The bank customer can use the described techniques to securely send sensitive information to a device of the personal banker without the personal banker being able to view the personal information.

Figure 5:
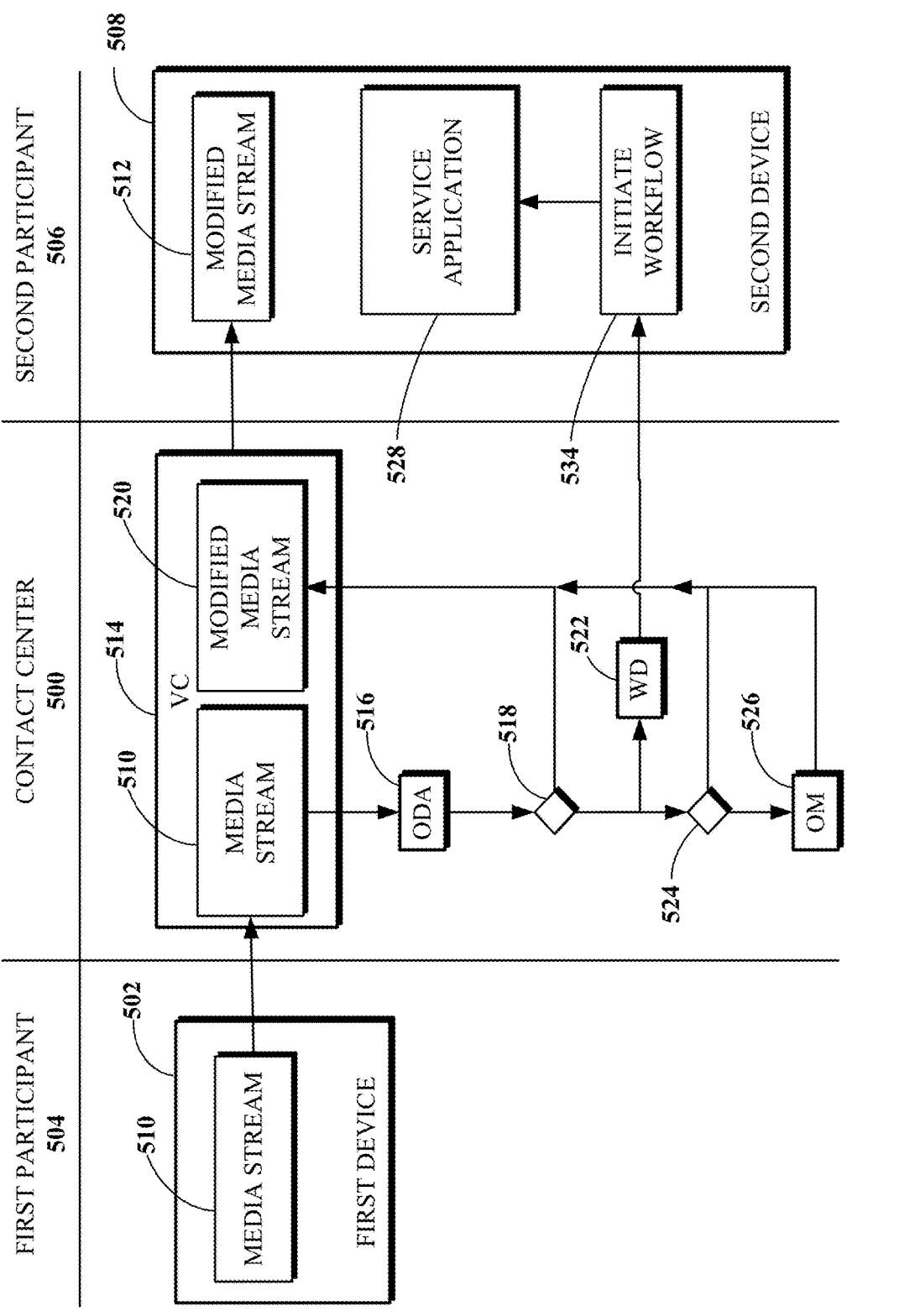
FIG. 5 is a data flow diagram of an example of a video conference session.

FIG. 5 is a data flow diagram of an example of a video conference session in which a contact center 500, such as the contact center 400 of FIG. 4, facilitates a video conference session between a first device 502 of a first participant 504 and a second device 508 of a second participant 506. In this example, the first device 502 produces a media data stream 510 to send to the second device 508 and the second device 508 receives a modified media data stream 512. However, in some implementations the second device 508 may produce a second media data stream to send to the first device 502 and the first device 502 may receive a second modified media data stream concurrently with the media data streams shown in FIG. 5. In other words, the transmission of media data streams between the first device 502 and the second device 508 may be a two-way transmission with each device 502, 508 sending a media data stream and receiving a media data stream at the same time. In the example of FIG. 5, the transmission of the media data stream is shown in a single direction for clarity.

In the example of FIG. 5, the first participant 504 may be a user of the contact center 500 and the second participant 506 may be an agent of the contact center 500. The first participant 504 operates the first device 502 to generate a media data stream 510 to send to the second participant 506. The media data stream 510 can include a video data stream captured by an image sensor of the first device 502 and an audio data stream captured by a microphone of the first device 502. The first participant 504 can present an object containing sensitive information to an image sensor of the first device 502 for transmission to the contact center 500. For example, the first participant 504 may hold up a credit card or an identification card to input sensitive information rather than typing the sensitive information or speaking the information out loud. The first participant 504 can present other objects that do not contain sensitive information as well, such as packaging for a product, product labels, brochures, bars codes, QR codes or other objects. Such objects typically do not contain sensitive information, but the images of the objects are still useful for inputting information rather than manually typing the information.

The first device 502 transmits the media data stream 510 to the contact center 500 over a communication network (not depicted). The media data stream 510 may include portions that do not include objects presented by the first participant 504, portions that include objects presented by the first participant 504 that include sensitive information, and portions that include objects presented by the first participant 504 with non-sensitive information. The media data stream 510 can be compressed, encrypted, and otherwise encoded by the first device 502 prior to transmitting the media data stream to the contact center 500.

A video conference component 514 of the contact center 500 receives the media data stream 510 sent by the first device 502. The video conference component 514 is an implementation of video conference software for facilitating a video conference between participant and may include software and/or hardware. The video conference component 514 manipulates the media data stream to prepare the media data stream for further processing such as decryption, decompression, demuxing, and/or other operations to extract video data from the media data stream. The video conference component 514 provides the video data from the media data stream to an object detection and analysis component 516 for detection of objects whose image is captured in the video data and analysis of the images.

The object detection and analysis component 516 is an implementation of object detection and analysis software and may use the same hardware as the video conference component or may be implemented by separate hardware. In some implementations, the object detection and analysis component 516 may be integrated in the video conference component 514. The object detection and analysis component 516 is configured to detect objects in the video data, identify the type of object detected, and extract information associated with the type of object. For example, when the detected object is a credit card, the object detection and analysis component 516 may identify portions of video frames containing the image of the credit card, generate metadata indicating the detected object is a credit card, and perform optical character recognition to extract text information from the credit card image.

At 518 a decision is made to either return the video data to the video conference component or to continue processing the video data. For portions of the video data in which no object is detected, the object detection and analysis component can return the video back to the video conference component 514 or notify the video conference component 514 that no object is present in the video data. The video conference component 514 may modify the media data stream to prepare it for transmission to the second participant 506 by compressing the media data stream, encrypting the media data stream, or otherwise modifying the media data stream to produce a modified media data stream 520.

In some implementations, for portions of the video data that the object detection and analysis component 516 detected an object and further processing is required, the metadata identifying the type of object and possible other information, such as a credit card number or identification number, is transmitted to a workflow determination component 522 for determining whether to initiate a particular workflow at the second device 508. In some implementations, associations between types of objects and at least one workflow may be stored at a data store and accessed by the workflow determination component 522 to determine when and which workflow should be initiated. For example, when the object detection and analysis component 516 detects a credit card, the workflow determination component 522 may look up types of workflows associated with credit cards. In some implementations, a payment workflow is associated with a credit card and the workflow determination component 522 may send data for triggering a payment workflow to the second device 508 responsive to identifying a credit card object type. The workflow determination component 522 may send the other information, such as the credit card number, to the second client device. Some object types may be associated with more than one type of workflow. In such instances, the workflow determination component 522 may send data identifying the multiple workflows to the second device 508 and the second participant 506 may select the proper workflow. Or, in other implementations, the workflow determination component 522 may predict the proper workflow based on the context of the video conference. For example, data indicating that the video conference is related to an item purchase may be used by the workflow determination component 522 to trigger a payment workflow, whereas data indicating that the video conference is related to item return may be used by the workflow determination component 522 to trigger a payment verification for refund workflow.

At 524 a decision is made as to whether mask sensitive information associated with the detected object or to leave the information in the video data. If there is no sensitive information associated with the object, the video data may be sent back to the video conference component 514 with no further modifications, or data indicating that no modifications are necessary can be sent to the video conference component 514. For example, if the detected object is a store receipt the original video data may be returned to the video conference component 514.

If the object detection and analysis component 516 determines that the object type is a type associated with sensitive data, the video data is transmitted to an object masking component 526 for masking the sensitive data. The object masking component 526 can use metadata generated by the object detection and analysis component 516 to mask portions of the video data that contain the sensitive information.

For example, the metadata may identify video frames containing the sensitive information and coordinates of the location of the object containing the sensitive data. The object masking component 526 can use this information to redact the video data to mask the sensitive data. The modified video data is then returned to the video conference component 514 for transmission to the second device 508.

The video conference component 514 sends the modified media data stream 520 to the second device 508 which then presents the modified media data stream 520 to the second participant 506. The modified media data stream 520 may contain a combination of unmodified video data and modified video data. The second device 508 receives the modified media data stream 520 and presents it to the second participant 506. When sensitive information is displayed by the first participant 504, the contact center 500 removes the sensitive information, and the modified media data stream is presented to the second participant 506. The workflow determination component 522 provides information associated with an object presented by the first participant 504, such as an identification of a workflow, credit card data, identification data, or product data, to a workflow initiation component 534 of the second device 508. The workflow initiation client then initiates a workflow in a service application 528 at the second device 508 based on the information.

Figure 6:
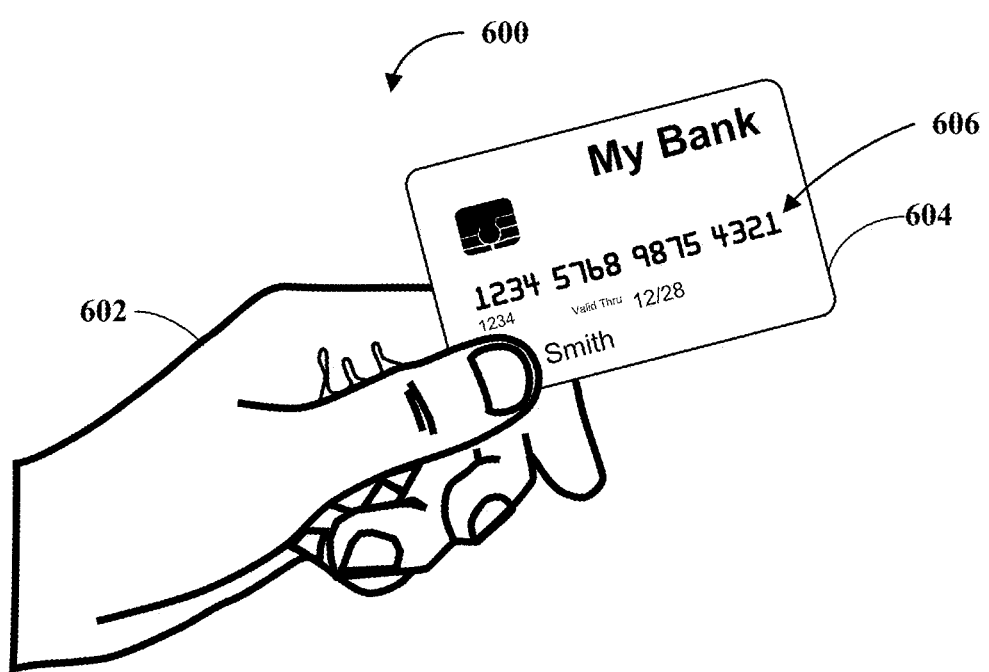
FIG. 6 is an example of visual information shared by a device of a conference participant sharing sensitive information.

FIG. 6 is an example of visual information shared by a device of a conference participant sharing sensitive information. The visual information includes an image 600 of a hand 602 of a first participant holding an object 604 having sensitive information 606 (e.g., the credit card number starting with 1234). For example, in response to a second participant, such as a contact center agent, asking the first participant for payment information, the first participant can hold their credit card in from of a camera of the first participant's device. The camera captures the credit card image including the sensitive information 606 (i.e., the credit card number). The contact center receives a media data stream that includes video data of the credit card including the sensitive information 606. As described previously, the contact center performs object detection and analysis to recognize that the first participant is displaying a credit card object type, identifies the object as containing sensitive information, extracts the sensitive information to send to an application associated with the second participant, and masks the sensitive information prior to displaying the image of the object to the second participant.

FIGS. 7 through 10 are examples of visual information shared by a device of a first conference participant as displayed at a device of a second participant in which sensitive information in masked. The visual information is derived from image 600 of the first participant holding the credit card as shown in FIG. 6 and FIGS. 7 through 10 each show different techniques that may be used to mask the sensitive information. The examples are not exhaustive and other techniques are possible as long as they mask the sensitive information so that the second participant is unable to view the information.

Figure 7:
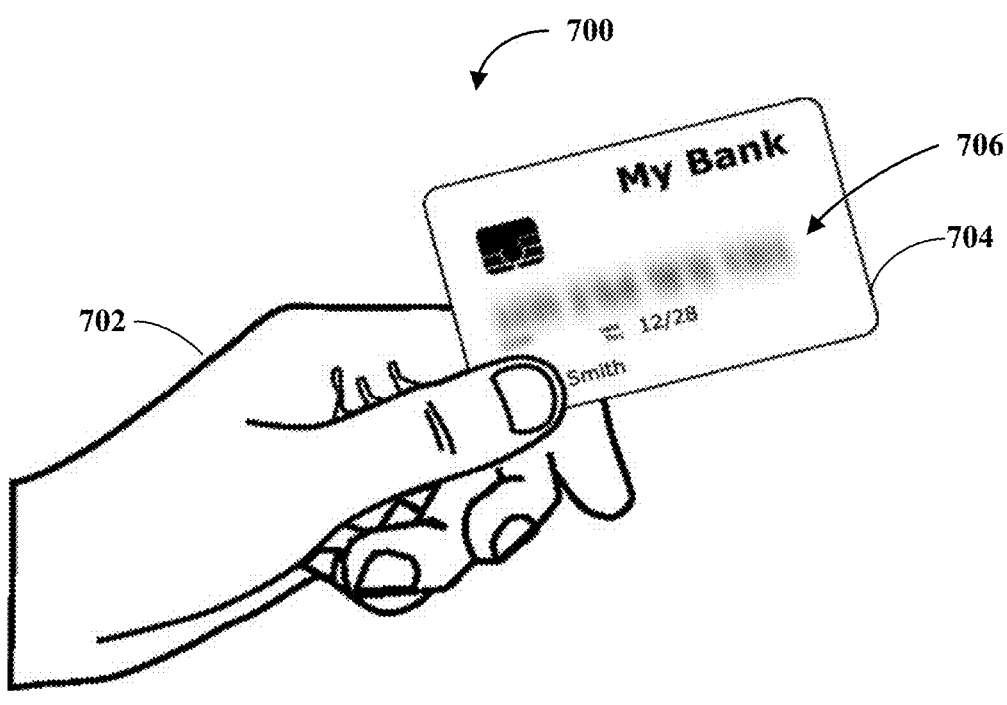
FIGS. 7-10 are examples of visual information shared by a device of a first conference participant as displayed at a device of a second participant in which sensitive information in masked.

In FIG. 7, the contact center has modified an image 700 of a hand 702 of a first participant holding a credit card 704 to blur sensitive information 706 prior to the credit card 704 being displayed at the second device. The image 700 is still recognizable as a user holding the credit card 704, however the credit card number and the Card Verification Code (CVC) number have had a blur filter applied to render the sensitive information 706 imperceivable. Thus, the second participant can see that the first participant is providing payment information but is unable to view the sensitive information 606 themselves.

Figure 8:
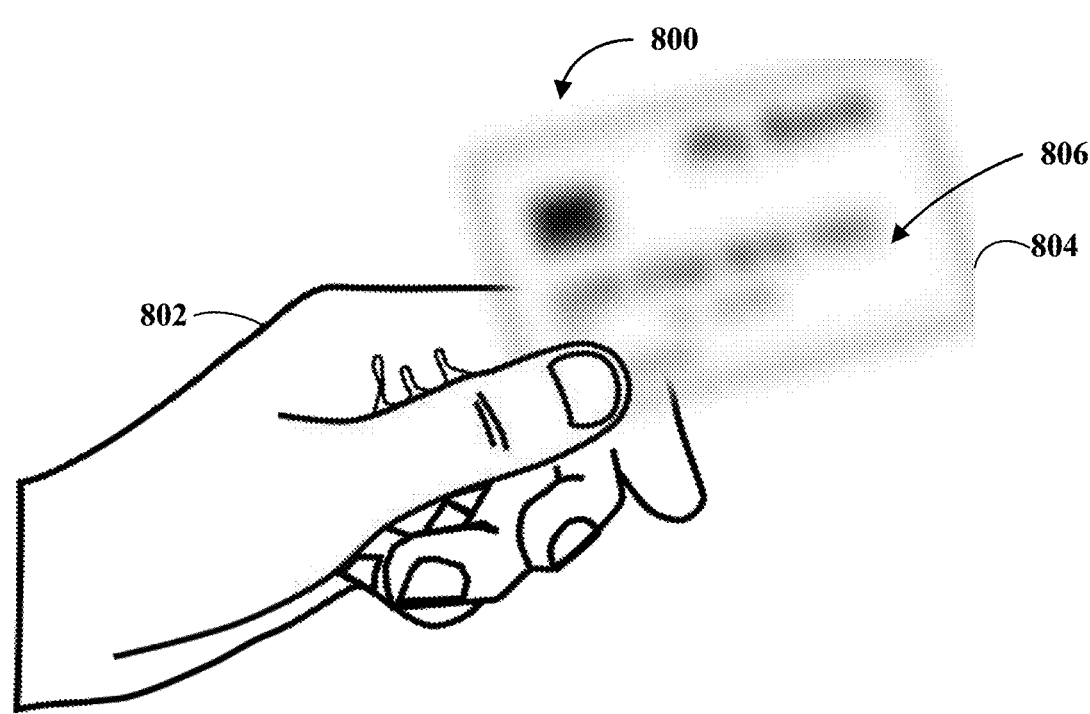

In FIG. 8, the contact center has modified an image 800 of a hand 802 of a first participant holding a credit card 804 to blur the entire credit card 804, including sensitive information 806, prior to the credit card 804 being displayed at the second device. The image is recognizable as the first participant holding a card, but the sensitive information contained on the credit card 804 is not discernable.

Figure 9:
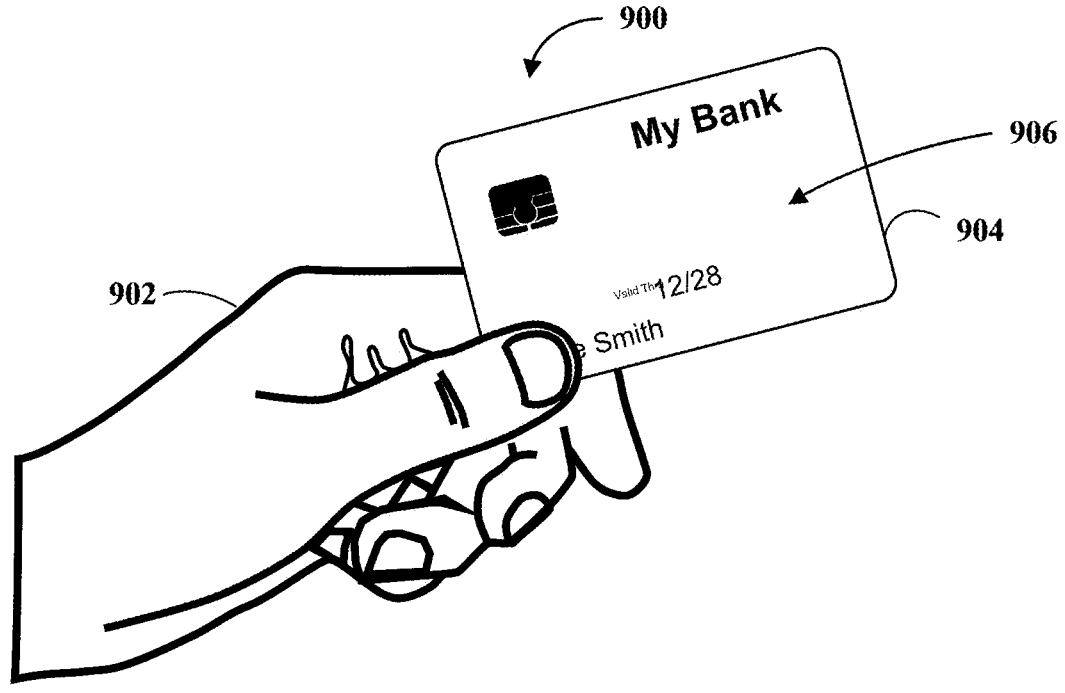

In FIG. 9, the contact center has modified an image 900 of a hand 902 of a first participant holding a credit card 904 to remove the pixels containing sensitive information 906 prior to the credit card 904 being displayed at the second device. The overall appearance of the credit card 904 is discernable but there is no visible sensitive information. The second participant is aware that they first participant is presenting a payment card, but there is no sensitive information displayed.

Figure 10:
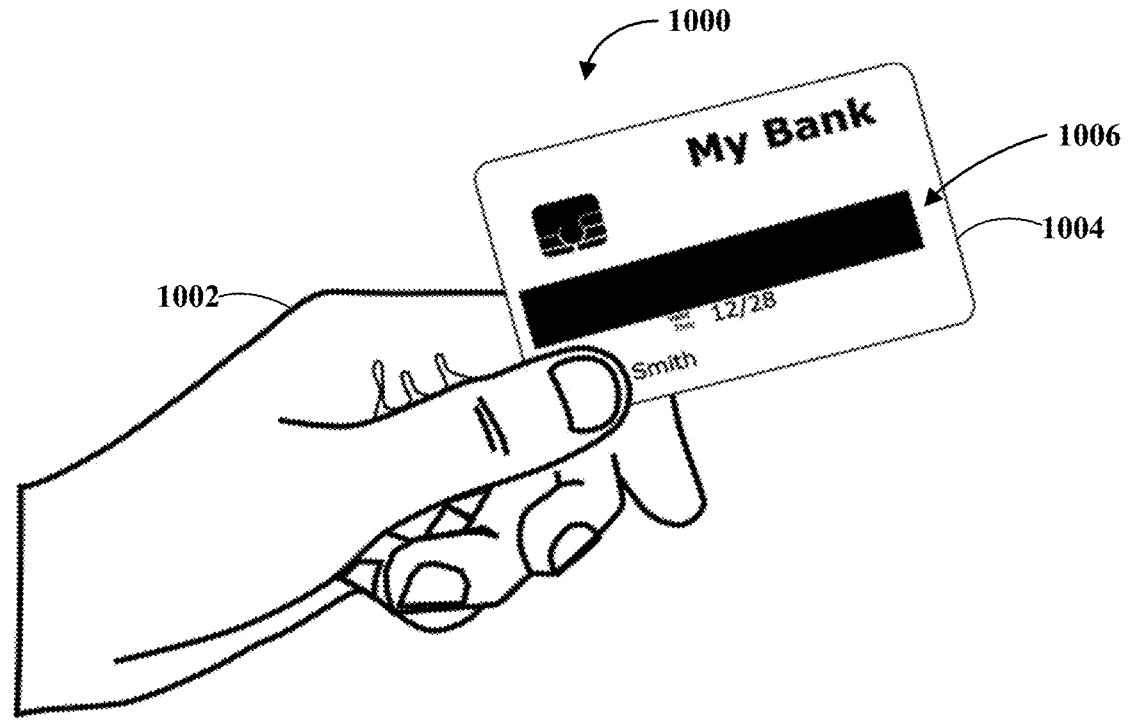

In FIG. 10, the contact center has modified an image 1000 of a hand 1002 of a first participant holding a credit card 1004 to black out pixels containing sensitive information 1006 prior to the credit card 1004 being displayed at the second device. Once again, the overall appearance of the credit card 1004 is recognizable, but there is no sensitive information being displayed.

To further describe some implementations in greater detail, reference is next made to examples of techniques which may be performed by or using a system for protecting sensitive information shared to a video conference. FIG. 11 is a flowchart of an example of a technique 1100 for masking sensitive information in in a video conference. The technique 1100 can be executed using computing devices, such as the systems, hardware, and software described with respect to FIGS. 1-10. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, a video stream captured by a camera device of a first participant of a video conference is received. The video stream can be encoded in a stream of media data that includes other information such as an audio stream, location information, and authentication information. The camera device can be a camera integrated in a device, such as a camera of a smart phone. The first participant can initiate the video stream as part of an interaction in a video conference. The video conference may be an interaction with an agent of a contact center providing services to the first participant. For instance, the interaction may be an interaction with a customer service agent of a contact center.

At 1104, the video stream is analyzed during the video conference to identify portions of the video stream containing sensitive information presented by the first participant and captured by the camera device. The first participant can present sensitive information by manipulating an object containing the sensitive information to be in view of the camera device. For example, the user can hold a credit card in front of the camera device to capture an image of the credit card.

The video stream can be analyzed to identify types of objects present in the video stream. Each type of object can have an associated sensitivity level. When an object type is detected that has a sensitivity level exceeding a threshold, the portion of the video stream displaying the image of the object can be identified as containing sensitive information.

At 1106, portions of the video stream containing sensitive information are masked to generate a redacted video stream. The portions of the video stream can be masked by editing the video to obscure the sensitive information. The redacted stream of video may blur, delete, remove, or other hide the sensitive information such that the sensitive information is no longer available in the video stream.

At 1108, the redacted video stream is output during the video conference for display at a display device of a second participant of the video conference. FIGS. 6 through 10 illustrate examples of how a redacted stream of video may appear when displayed at a display device of the second participant of the video conference. Other types of masking are possible and the examples of FIGS. 6 through 10 are merely examples of techniques for masking the sensitive data.

FIG. 12 is a flowchart of an example of a technique 1200 for implementing a workflow based on an object presented by a participant in a video conference. The technique 1200 can be executed using computing devices, such as the systems, hardware, and software described with respect to FIGS. 1-10. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

At 1202 a video stream captured by a camera device of a first participant of a video conference is received. The video stream can be encoded in a stream of media data that includes other information such as an audio stream, location information, and authentication information. The camera device can be a camera integrated in a device, such as a camera of a smart phone. The first participant can initiate the video stream as part of an interaction in a video conference. The video conference may be an interaction with an agent of a contact center providing services to the first participant. For instance, the interaction may be an interaction with a customer service agent of a contact center.

At 1204 object detection is performed on the video stream during the video conference to determine an object type of an object presented by the first participant to the camera device. The first participant can present on object to the camera device by holding the object in front of the camera device or otherwise positioning the object in front of the camera device. The object can be an object related to the interaction between the first participant and a second participant. The object can include information such as an account number, an identification number, an order number, or other information that may be cumbersome to input using a touchpad. For example, the first participant can hold a receipt in front of the camera device to present the receipt to the camera device.

At 1206 a workflow related to the object type is determined based on determined object type. The type of object detected can have associated properties such as a typical workflow, information types associated with the object, and levels of sensitivity. Thus, the type of object determined at 1204 can be referenced against the properties to identify a workflow associated with the object. Examples of object types include payment objects such as credit cards, debit cards, gift cards, checks, and other payment types, identification objects such as identification cards, purchase history objects such as receipts, and intended purchases such brochures and product literature.

At 1208 the workflow is executed for a second participant of the video conference. The second participant can be an agent of a contact center and the workflow can be initiated at a computing device associated with the agent. For example, the agent can have a service application implemented at the computing device and the service application can perform an action based on the type of object detected in the video data stream. The object detected in the video data stream can have associated information, such as characters printed on the object, which can be used as input to the service application. Returning to the example of a participant holding a receipt in front of the camera device, the object detection can extract purchase information such as a barcode or receipt number from the receipt and automatically start a return item workflow using the barcode or receipt number to look up the purchase.

Some implementations are described below as numbered examples (Example A, B, C, etc.). These examples are provided as examples only and do not limit the other implementations disclosed herein.

Example A is a method including: receiving a video stream captured by a camera device of a first participant of a video conference; performing object detection on the video stream during the video conference to determine an object type of an object presented by the first participant to the camera device; determining a workflow related to the object type based on the determined object type; and outputting data for executing the workflow at a device of a second participant of the video conference.

Example B is the method of Example A where the first participant is a user of a contact center, and the second participant is an agent of the contact center.

Example C is the method of Example A further including: determining that the type of object is a payment card; and determining that the workflow related to the type of object is a payment workflow.

Example D is the method of Example A further including: determining that the object presented by the first participant displays sensitive information; and masking the sensitive information in the video stream to generate a redacted video stream for display to the second participant.

Example E is the method of Example A further including: determining that the object presented by the first participant displays sensitive information; extracting the sensitive information from the video stream for use in the workflow; masking the sensitive information in the video stream to generate a redacted video stream for display to the second participant; and sending the sensitive information to the device of the second participant.

Example F is the method of Example A further including: determining that the object includes text information; performing optical character recognition to extract text information from the object; and sending the text information to the device of the second participant.

Example G is the method of Example A further including: extracting information from the object; and unlocking a physical object in the vicinity of the first participant based on the contents of the extracted information.

Example H is an apparatus that includes: a network communication interface; a memory; and a processor configured to execute instructions stored in memory to: receive a video stream captured by a camera device of a first participant of a video conference; perform object detection on the video stream during the video conference to determine an object type of an object presented by the first participant to the camera device; determine a workflow related to the object type based on the determined object type; and output data for executing the workflow at a device of a second participant of the video conference.

Example I is the apparatus of Example H where the type of object is a payment card and to determine a workflow related to the object type includes: determining a payment workflow based on the payment card type of object.

Example J is the apparatus of Example H where the workflow is a customer service workflow executed at the device of the second participant.

Example K is the apparatus of Example H where the processor is configured to execute instructions stored in memory to: determine that the object type is associated with sensitive information; and mask the sensitive information in the video stream to generate a redacted video stream for display to the second participant.

Example L is the apparatus of Example H where the processor is configured to execute instructions stored in memory to: determine that the object type is associated with sensitive information; extract the sensitive information from the video stream for use in the workflow; mask the sensitive information in the video stream to generate a redacted video stream for display to the second participant; and send the sensitive information to the device of the second participant.

Example M is the apparatus of Example H where the processor is configured to execute instructions stored in memory to: determine that the object type is associated with text information; perform optical character recognition to extract text information from the object; and send the text information to the device of the second participant.

Example N is the apparatus of Example H where the processor is configured to execute instructions stored in memory to: extract unlocking information from the object; and send a signal to unlock a physical object in the vicinity of the first participant based on the unlocking information.

Example O is a non-transitory computer-readable medium storing instructions operable to cause one or more processors to perform operations including: receiving a video stream captured by a camera device of a first participant of a video conference; performing object detection on the video stream during the video conference to determine an object type of an object presented by the first participant to the camera device; determining a workflow related to the object type based on the determined object type; and outputting data for executing the workflow at a device of a second participant of the video conference.

Example P is the non-transitory computer-readable medium of Example O where the first participant is a user of a contact center, and the second participant is a local agent of the contact center.

Example Q is the non-transitory computer-readable medium of Example O where the instructions are further operable to cause the one or more processors to perform operations including: determining that the type of object is a payment card displaying a payment card number; performing optical character recognition to read the payment card number; and sending the payment card number to the device of the second participant.

Example R is the non-transitory computer-readable medium of Example O where the instructions are further operable to cause the one or more processors to perform operations including: determining that the type of object is a payment card displaying a payment card number; performing optical character recognition to read the payment card number; masking the payment card number in the video stream to generate a redacted video stream; and sending the redacted video stream to the device of the second participant for display and including the payment card number in the data output for executing a workflow at the device of the second participant.

Example S is the non-transitory computer-readable medium of Example O where the instructions are further operable to cause the one or more processors to perform operations including: determining that the object presented by the first participant displays sensitive information; extracting the sensitive information from the video stream for use in the workflow; and masking the sensitive information in the video stream to generate a redacted video stream for display to the second participant.

Example T is the non-transitory computer-readable medium of Example O where the instructions are further operable to cause the one or more processors to perform operations including: determining that the object type is associated with a locked physical object in the vicinity of the first participant; and unlocking the physical object based on the object.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
receiving a video stream captured by a camera device of a first participant of a video conference;
performing object detection on the video stream during the video conference to determine an object type of a physical object presented by the first participant to the camera device;
determining a workflow related to the object type based on the determined object type,
wherein the workflow is selected from a plurality of different workflows based on the determined object type, and
wherein a first object type corresponds to a first workflow and a second, different object type corresponds to a second, different workflow; and
outputting data for executing the workflow at a device of a second participant of the video conference.

2. The method of claim 1, wherein the first participant is a user of a contact center, and the second participant is an agent of the contact center.

3. The method of claim 1, further comprising:
determining that the type of object is a payment card; and
determining that the workflow related to the type of object is a payment workflow.

4. The method of claim 1, further comprising:
determining that the object presented by the first participant displays sensitive information; and
masking the sensitive information in the video stream to generate a redacted video stream for display to the second participant.

5. The method of claim 1, further comprising:
determining that the object presented by the first participant displays sensitive information;
extracting the sensitive information from the video stream for use in the workflow;
masking the sensitive information in the video stream to generate a redacted video stream for display to the second participant; and
sending the sensitive information to the device of the second participant.

6. The method of claim 1, further comprising:
determining that the object includes text information;
performing optical character recognition to extract the text information from the object; and
sending the text information to the device of the second participant.

7. The method of claim 1, further comprising:
extracting information from the object; and
unlocking a physical object in a vicinity of the first participant based on contents of the extracted information.

8. An apparatus, comprising:
a network communication interface;
a memory; and
a processor configured to execute instructions stored in the memory to:
receive a video stream captured by a camera device of a first participant of a video conference;
perform object detection on the video stream during the video conference to determine an object type of a physical object presented by the first participant to the camera device;
determine a workflow related to the object type based on the determined object type,
wherein the workflow is selected from a plurality of different workflows based on the determined object type, and
wherein a first object type corresponds to a first workflow and a second, different object type corresponds to a second, different workflow; and
output data for executing the workflow at a device of a second participant of the video conference.

9. The apparatus of claim 8, wherein the type of object is a payment card and to determine the workflow related to the object type comprises:
determining a payment workflow based on the payment card type of object.

10. The apparatus of claim 8, wherein the workflow is a customer service workflow executed at the device of the second participant.

11. The apparatus of claim 8, wherein the processor is configured to execute instructions stored in the memory to:
determine that the object type is associated with sensitive information; and
mask the sensitive information in the video stream to generate a redacted video stream for display to the second participant.

12. The apparatus of claim 8, wherein the processor is configured to execute instructions stored in the memory to:
determine that the object type is associated with sensitive information;
extract the sensitive information from the video stream for use in the workflow;
mask the sensitive information in the video stream to generate a redacted video stream for display to the second participant; and send the sensitive information to the device of the second participant.

13. The apparatus of claim 8, wherein the processor is configured to execute instructions stored in the memory to:

determine that the object type is associated with text information;

perform optical character recognition to extract the text information from the object; and send the text information to the device of the second participant.

14. The apparatus of claim 8, wherein the processor is configured to execute instructions stored in the memory to:

extract unlocking information from the object; and send a signal to unlock a physical object in a vicinity of the first participant based on the unlocking information.

15. A non-transitory computer-readable medium storing instructions operable to cause one or more processors to perform operations comprising:

receiving a video stream captured by a camera device of a first participant of a video conference;

performing object detection on the video stream during the video conference to determine an object type of a physical object presented by the first participant to the camera device;

determining a workflow related to the object type based on the determined object type, wherein the workflow is selected from a plurality of different workflows based on the determined object type, and wherein a first object type corresponds to a first workflow and a second, different object type corresponds to a second, different workflow; and outputting data for executing the workflow at a device of a second participant of the video conference.

16. The non-transitory computer-readable medium of claim 15, wherein the first participant is a user of a contact center, and the second participant is a local agent of the contact center.

17. The non-transitory computer-readable medium of claim 15, wherein the instructions are further operable to cause the one or more processors to perform operations comprising:

determining that the type of object is a payment card displaying a payment card number;

performing optical character recognition to read the payment card number; and sending the payment card number to the device of the second participant.

18. The non-transitory computer-readable medium of claim 15, wherein the instructions are further operable to cause the one or more processors to perform operations comprising:

determining that the type of object is a payment card displaying a payment card number;

performing optical character recognition to read the payment card number;

masking the payment card number in the video stream to generate a redacted video stream; and sending the redacted video stream to the device of the second participant for display and including the payment card number in the data output for executing a workflow at the device of the second participant.

19. The non-transitory computer-readable medium of claim 15, wherein the instructions are further operable to cause the one or more processors to perform operations comprising:

determining that the object presented by the first participant displays sensitive information;

extracting the sensitive information from the video stream for use in the workflow; and masking the sensitive information in the video stream to generate a redacted video stream for display to the second participant.

20. The non-transitory computer-readable medium of claim 15, wherein the instructions are further operable to cause the one or more processors to perform operations comprising:

determining that the object type is associated with a locked physical object in a vicinity of the first participant; and unlocking the physical object based on the object.

* * * * *